Aug. 12, 1947.  H. BUTLER  2,425,595
SUPPORTING MEANS FOR THE MOVING ELEMENTS OF
ELECTRICAL INDICATING INSTRUMENTS
Filed Nov. 29, 1944  3 Sheets-Sheet 2

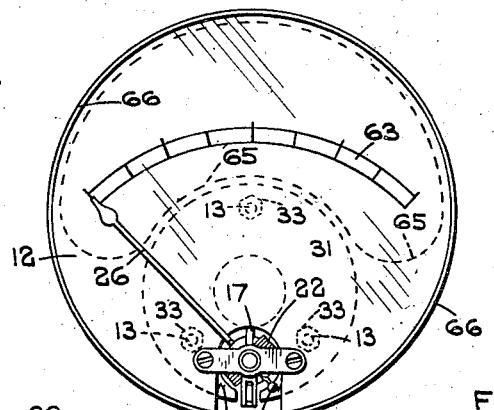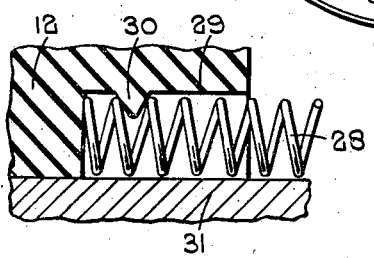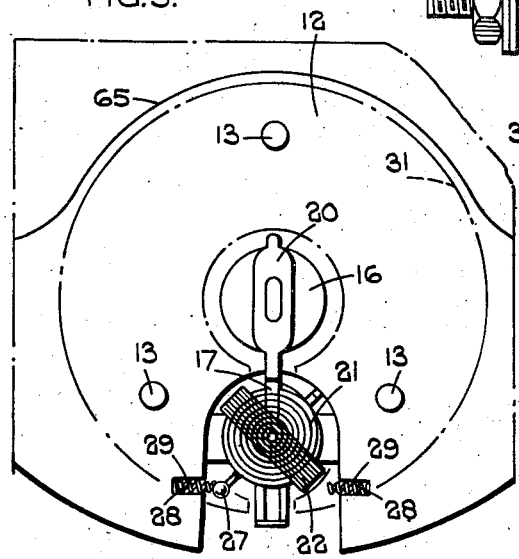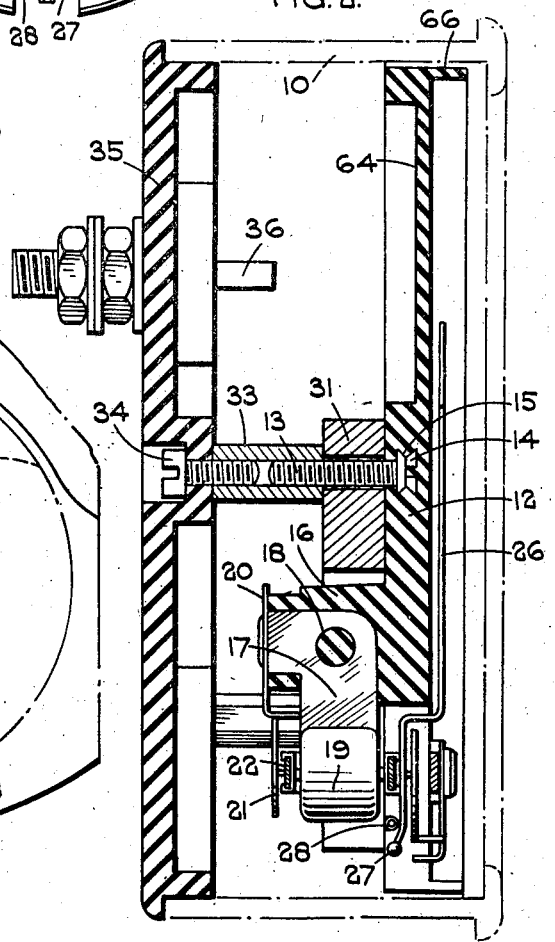

INVENTOR
Howard Butler.
BY
ATTORNEY.

Aug. 12, 1947.   H. BUTLER   2,425,595
SUPPORTING MEANS FOR THE MOVING ELEMENTS OF
ELECTRICAL INDICATING INSTRUMENTS
Filed Nov. 29, 1944   3 Sheets-Sheet 3
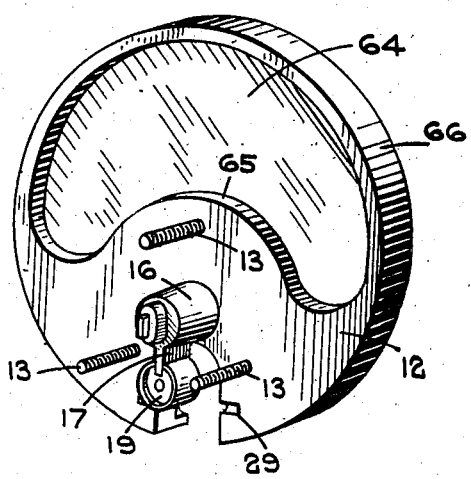
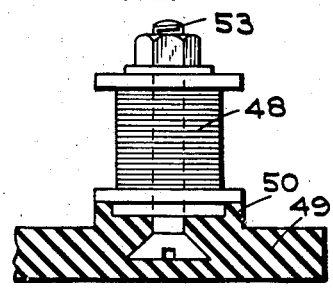
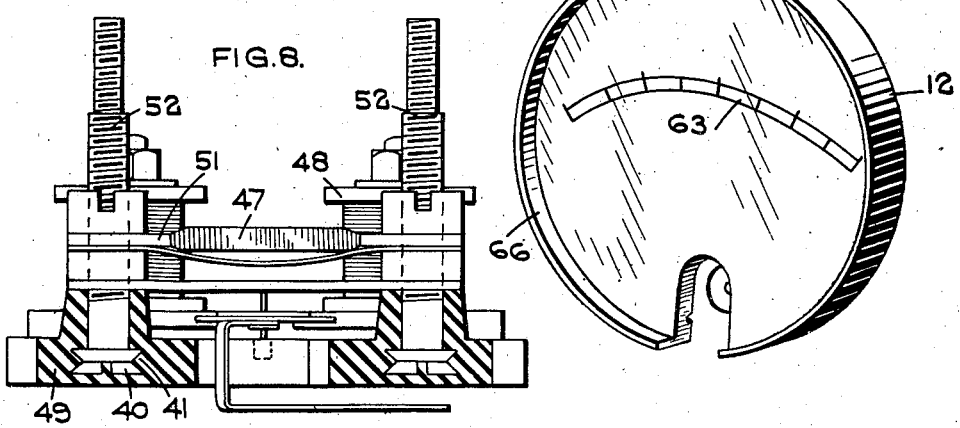
INVENTOR
Howard Butler
BY Henry J. Locke
ATTORNEY.

Patented Aug. 12, 1947

2,425,595

UNITED STATES PATENT OFFICE 2,425,595

SUPPORTING MEANS FOR THE MOVING ELEMENTS OF ELECTRICAL INDICATING INSTRUMENTS

Howard Butler, Walsall, England

Application November 29, 1944, Serial No. 565,642
In Great Britain September 3, 1943

7 Claims. (Cl. 171—95)

This invention relates to measuring or indicating instruments of the kind having a tubular casing containing the operating gear, and having a dial extending across one end of the casing with a pivotally movable indicator arm controlled by the operating gear movable across the outer side of the dial.

The invention is, for instance, applicable to electrical measuring instruments such as ammeters and volt meters of the kind having a base above which is a magnet, between the poles of which is mounted an actuating unit including a coil and a core, one of these members being spring-loaded and mounted for oscillation about a centre and carrying the indicator arm moving over a scale marked on the dial.

The present invention is also applicable to liquid or gas pressure gauges wherein it has hitherto been the usual practice to employ a cup-shaped casing and to mount the operating mechanism on the inner side of the closed end of the casing, the mechanism thus being enclosed within the tubular casing and the indicator arm being mounted on the pivot near the open end of the casing, and the dial being secured to the casing near its open end.

A similar arrangement has been used in connection with liquid level indicating instruments, for instance, petrol gauges, the operating mechanism usually being mounted on the closed end of a cup-shaped casing, and the dial being secured to the casing near its open end with the indicating arm operating over the outer face of the dial.

The present method of manufacture and assembly in connection with pressure gauges and liquid level indicating instruments renders the operations of assembly, adjustment and repair slow and difficult as the parts are not readily accessible, and one of the objects of the present invention as applied to such instruments and to electrical measuring instruments is to reduce manufacturing costs by facilitating the operations of assembly, adjustment and repairs.

According to the present invention, I provide an assembly plate for instruments of the kind referred to, having one or more pillars or brackets moulded or cast therein and projecting from one side thereof for supporting the actuating mechanism of the instrument.

In certain instruments, the assembly plate carrying the actuating mechanism may be disposed across one end of the casing so that the plate carrying the actuating mechanism can be withdrawn from the casing.

I may provide an assembly plate having one or more pillars or brackets moulded or cast therein and projecting from one side thereof for supporting the actuating mechanism of the instrument.

The dial scale may be marked directly upon the opposite side of the combined dial and assembly plate, or the dial scale marking may be made on a separate sheet of material secured to the opposite side of the combined dial and assembly plate.

Further, as applied to electrical measuring instruments, such as ammeters and volt meters of the kind already referred to, the combined dial and assembly plate may be made of moulded or cast material with screws or anchorage brackets moulded therein, and the magnet may be secured directly to one side of the combined dial and assembly plate, while a cast or moulded-in bracket may be used for carrying the essential part of the operating mechanism.

Further, in such an instrument an assembly plate with the moulded-in screws and/or bracket may be of substantial thickness and may be formed with a gap at a suitable position, in opposite sides of which are formed pockets for receiving buffer units for the indicating arm of the instrument.

These pockets may be formed as cavities which are open to the underside of the assembly plate and are closed by the magnet which is secured directly thereto.

In applying the invention to pressure indicators or liquid level indicators or to clocks, the combined dial and assembly plate is made of moulded or cast material with the heads of securing members or screws moulded therein so that the screws or securing members project from one side thereof and can be used for securing the operating mechanism directly to the back of the plate, and the plate is secured across one end of a tubular casing containing the operating mechanism, the arrangement being such that the plate is withdrawable from the casing, bringing the operating mechanism with it.

In all applications of the invention, the combined dial and assembly plate may be provided with a recessed back so that the portion where the dial scale is marked is so thin as to be translucent, enabling the dial to be illuminated from the back.

The assembly plate or the combined dial and assembly plate may be moulded or cast with an integral peripheral lip forming a bezel projecting from that side of the plate which is opposite to the side where the securing members or brackets for holding the actuating mechanism are disposed.

Referring to the drawings—

Figure 1 is a plan view showing the invention applied to an ammeter.

Figure 2 is a sectional view in side elevation.

Figure 3 is a plan view with one end of the casing removed.

Figure 4 is a sectional view on an enlarged scale showing a detail of construction.

Figure 8 is a section on line 8—8 of Figure 7.

Figure 9 is a section on line 9—9 of Figure 7.

Figure 10 is a perspective view showing one form of combined dial and assembly plate.

Figure 11 is a perspective view showing the opposite side of the combined dial and assembly plate.

Figure 5:
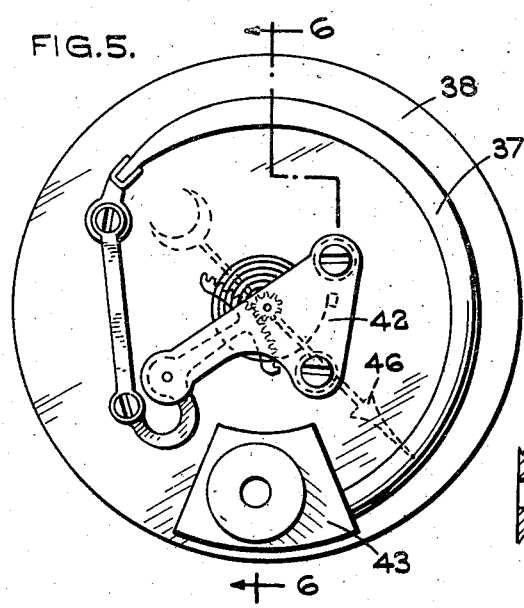
Figure 5 is a plan view showing the application of the invention to a pressure gauge.

In the construction shown in Figures 1 to 4, the invention is shown applied to a micro-ammeter having a casing 10 provided with an inwardly projecting flange 11 at one end, under which a glass can be secured.

The combined dial and assembly plate is shown at 12 and is produced of moulded material such as synthetic resin or die-cast metal.

Anchorage screws 13 have their heads 14 provided with V section circumferential grooves 15 and are moulded in the plate 12.

Further, the plate 12 is moulded with an integral lug 16 in which is moulded an L-shaped bracket 17. This bracket is provided with an opening 18 through which the moulded or cast material keys.

One end of the bracket carries the core 19 of the operating mechanism, and the other end of the bracket carries a terminal plate 20, the bracket extending through an opening in this plate and being riveted over on to its surface.

A conducting wire is attached to the plate 20 and the opposite end of the plate is attached to the outer end of a hair spring 21, the inner end of which is connected to the usual moving coil 22.

The indicator arm is shown at 26 and is attached to the moving coil. The indicator arm is extended beyond the centre of the moving coil and is provided with a head 27 adapted to come into contact with buffer springs 28 at the ends of its permitted movement.

The combined dial and assembly plate is provided with two cavities 29 which are open at one side so that the buffer springs 28 can be placed in position, and the cavities 29 are provided each with an internal projection 30 so as to retain the buffer springs 28 in position.

The open side of each cavity 29 is closed by the magnet 31.

The magnet 31 is provided with three holes through which the screws 13 extend, and the magnet is secured in position by distance nuts 33 which also receive the shanks of screws 34 employed to retain in position the end plate 35 closing the end of the casing 10.

The plate 35 is provided with terminal pins, one of which is shown at 36.

The part of the combined dial and assembly plate 12 in which the screws 13 are moulded or cast is of substantial thickness, but the part where the dial scale 63 is situated may be much thinner. This area is shown at 64 and is defined by the line 65 in Figure 1. By making this part of the plate thinner, the scale 63 can be illuminated from behind.

Further, the plate 12 may be provided with a projecting circumferential lip or bezel 66 which is adapted to bear against the glass so as to provide clearance for the indicator arm 26.

Figure 6:
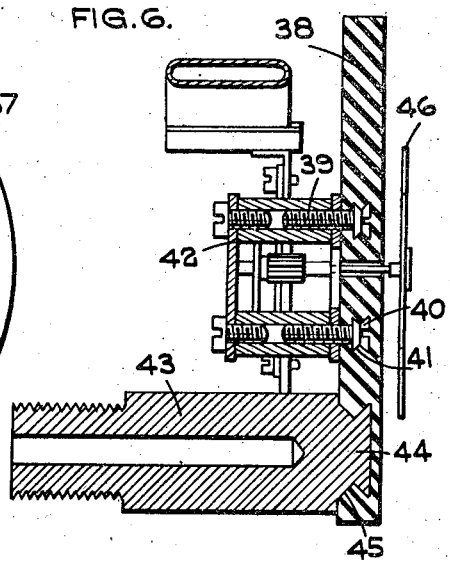
Figure 6 is a section on line 6—6 of Figure 5.

In the construction shown in Figures 5 and 6, the invention is applied to a pressure gauge in which the operative member 37 is in the form of a curved tube. In this construction the combined dial and assembly plate is shown at 38 and this plate is made of moulded or cast material with anchorage screws 39 provided with heads 40 having circumferential V section grooves 41 moulded therein, the screws being used for securing the operating mechanism indicated generally at 42, which forms no part of this invention.

The anchorage plate and dial 38 further carries a post 43, one end of which is formed with a portion 44 having a circumferential V section groove 45 which is moulded into the plate, and this post is used for carrying the tube 37 forming part of the operating mechanism.

The combined dial and anchorage plate is secured to the open end of a cylindrical casing (not shown) which encloses the operating gear, and the end of the casing is also provided with a glass engaging over the indicating arm 46.

Figure 7:
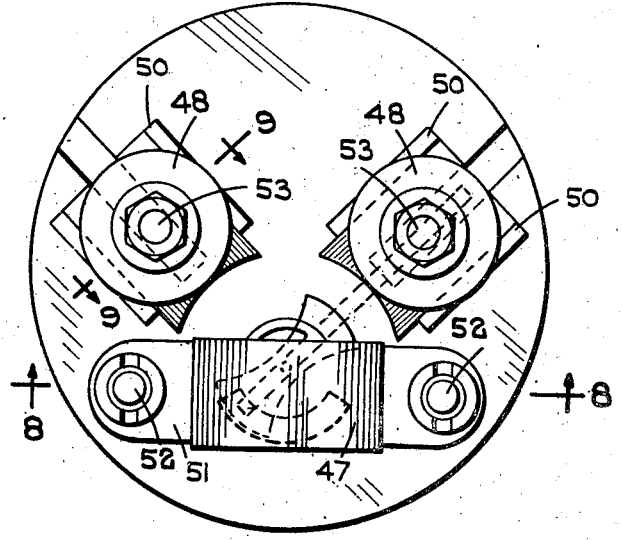
Figure 7 is a plan view showing the application of the invention to a liquid level gauge.

In the construction shown in Figures 7, 8 and 9, the invention is shown as applied to a liquid level indicator having operating mechanism of known form, the operating mechanism including an actuating coil 47 and two adjustable solenoids 48.

The combined dial and assembly plate is shown at 49 and has moulded thereon parallel ribs or keys 50 in which the solenoids 48 can slide. The instrument may be of the moving iron type, and a bridge plate 51 is secured to the combined dial and assembly plate by means of screws 52, the heads of which are moulded in the combined dial and assembly plate. This plate may be produced of cast or moulded material such as synthetic resin or die-cast metal. The solenoids 48 are secured by screws 53, the heads of which can be adjusted along slots moulded in the plate 49.

What I claim then is:

1. In a measuring instrument having a tubular casing containing the operating gear, and having a dial extending across one end of the casing with a pivotally movable indicator arm controlled by the operating gear movable across the outer side of the dial, the combination of a casing, an assembly plate secured across one end of the casing, a supporting member having a portion moulded in the thickness of said assembly plate, said supporting member projecting from one side of the assembly plate, and operating mechanism for the instrument mounted on said supporting member, said assembly plate being withdrawable from the casing together with said operating mechanism.

2. In an electrical measuring instrument, the combination of an assembly plate, and a supporting member having a portion moulded in the thickness of said assembly plate, said supporting member forming an L-shaped bracket arranged with the ends of both limbs projecting from the assembly plate, each of said ends extending into and carrying an element of the operating mechanism of the instrument.

3. In an electrical measuring instrument, the combination of an assembly plate, a supporting member having a portion moulded in the thickness of said assembly plate, said supporting member forming an L-shaped bracket arranged with the ends of both limbs projecting from the assembly plate, each of said ends carrying an element of the operating mechanism for the instrument, the other of said ends carrying a terminal plate, and an indicator arm associated with said operating mechanism, said indicator arm operating over a scale marked on the front side of said assembly plate, said assembly plate being recessed at the back behind the scale marking.

4. In an electrical measuring instrument, the combination of an assembly plate, said assembly plate being of gapped circular disc-like form, a supporting member having a portion moulded in the thickness of said assembly plate, said supporting member forming an L-shaped bracket arranged with the ends of both limbs projecting from the assembly plate, one of said ends carrying an element of the operating mechanism for the instrument, the other of said ends carrying a terminal plate, an indicator arm associated with said operating mechanism, said indicator arm operating over a scale marked on the front side of said assembly plate, said indicator arm having an extension provided with a head, said assembly plate having two recesses, one at each side of its gap, buffer springs in said recesses disposed for engagement by said head.

5. A combined dial and assembly plate for use in an electrical measuring instrument, said plate consisting of a moulded disc of gapped circular form, having at one side a scale marking and a peripheral lip forming a bezel, and having at its opposite side a projecting lug adjacent the gap, and screws, the heads of which are moulded in said plate, and a supporting member moulded in said lug and having two limbs projecting from the lug.

6. A combined dial and assembly plate for an electrical measuring instrument comprising a moulded plate of gapped circular form, a lug integrally moulded on the back of the dial and assembly plate, a supporting member embedded in said lug and projecting therefrom at the end and at the side of the lug into the gap of the plate, said supporting member carrying the operating mechanism of the instrument including an indicating arm extending across the front of the dial and assembly plate.

7. A combined dial and assembly plate for an electrical measuring instrument comprising a moulded plate of gapped circular form, a lug integrally mounted on the back of the dial and assembly plate, an L-shaped supporting member embedded in said lug, said member having an opening through its thickness through which the moulded material of the plate is fed, the ends of the supporting member projecting respectively from the end and side of the lug, the latter end projecting into the gap of the plate, said ends extending into elements of the operating mechanism of the instrument.

HOWARD BUTLER.

REFERENCES CITED

The following references are of record in the file of this patent:

UNITED STATES PATENTS

| Number | Name | Date |
|---|---|---|
| 2,116,154 | Lamb | May 3, 1938 |
| 2,128,277 | Young et al. | Aug. 30, 1938 |
| 2,346,572 | Goodwin | Apr. 11, 1944 |
| 2,364,724 | Klay et al. | Dec. 12, 1944 |